(12) United States Patent
Zhang et al.

(10) Patent No.: US 12,111,240 B2
(45) Date of Patent: Oct. 8, 2024

(54) METHOD AND SYSTEM FOR MEASURING REFRACTIVE INDEX OF PARTICLE SAMPLE BY USING POLARIZATION DIFFERENCE OF SCATTERED LIGHT DISTRIBUTION

(71) Applicant: LINKOPTIK INSTRUMENTS CO., LTD., Zhuhai (CN)

(72) Inventors: Fugen Zhang, Zhuhai (CN); Chenyu Zhang, Zhuhai (CN)

(73) Assignee: LINKOPTIK INSTRUMENTS CO., LTD., Zhuhai (CN)

( * ) Notice: Subject to any disclaimer, the term of this patent is extended or adjusted under 35 U.S.C. 154(b) by 320 days.

(21) Appl. No.: 17/732,582

(22) Filed: Apr. 29, 2022

(65) Prior Publication Data
US 2022/0252497 A1    Aug. 11, 2022

Related U.S. Application Data

(63) Continuation of application No. PCT/CN2020/096495, filed on Jun. 17, 2020.

(30) Foreign Application Priority Data

Nov. 5, 2019    (CN) .......................... 201911071791.6

(51) Int. Cl.
*G01N 15/0205*    (2024.01)
(52) U.S. Cl.
CPC ................................ *G01N 15/0211* (2013.01)
(58) Field of Classification Search
None
See application file for complete search history.

(56) References Cited

U.S. PATENT DOCUMENTS 4,957,363 A * 9/1990 Takeda ............... G01N 15/1434
250/222.2
5,037,202 A    8/1991 Batchelder et al.
(Continued)

FOREIGN PATENT DOCUMENTS

| CN | 105043944 A | 11/2015 |
| CN | 105891066 A | 8/2016 |

(Continued)

OTHER PUBLICATIONS

Internation Search Report of PCT/CN2020/096495, Mailed Sep. 21, 2020.

*Primary Examiner* — Raul J Rios Russo
*Assistant Examiner* — Carl F. R. Tchatchouang

(57) ABSTRACT

A method and system for measuring a refractive index of a particle sample by using a polarization difference of scattered light distribution. The method comprises: acquiring a vertically polarized scattered light energy distribution $E_\perp$ and a horizontally polarized scattered light energy distribution $E_\parallel$, and calculating a scattered light energy distribution polarization difference $E_d$; according to Mie theory, calculating a vertically polarized scattered light energy matrix (aa) and a scattered light polarization difference matrix (bb) with k×l dimensions under a supposed refractive index value of $n^{(i)}$; calculating a particle size distribution $W^{(i)}$ of a measured particle; acquiring a polarization difference of scattered light distribution (cc); calculating a RMS error $\sigma^{(j)}$ of $E_d$ and (cc); changing the refractive index value; and repeating the process over and over until finding a refractive index value with the smallest RMS error, wherein the refractive index is the true refractive index of the particle sample.

2 Claims, 2 Drawing Sheets

(56) References Cited

U.S. PATENT DOCUMENTS

| | | | |
|---|---|---|---|
| 5,104,221 A | 4/1992 | Bott et al. | |
| 10,768,095 B2 * | 9/2020 | Takahashi | A61B 5/14553 |
| 2020/0110017 A1 * | 4/2020 | Allier | G01N 15/1434 |

FOREIGN PATENT DOCUMENTS

| | | | | |
|---|---|---|---|---|
| CN | 108562522 A | | 9/2018 | |
| CN | 108872152 A | | 11/2018 | |
| CN | 109883930 A | | 6/2019 | |
| CN | 110687022 A | | 1/2020 | |
| EP | 0361770 A2 | * | 4/1990 | |
| JP | 2008096430 A | * | 4/2008 | ....... G01N 21/95607 |

* cited by examiner

METHOD AND SYSTEM FOR MEASURING REFRACTIVE INDEX OF PARTICLE SAMPLE BY USING POLARIZATION DIFFERENCE OF SCATTERED LIGHT DISTRIBUTION

CROSS-REFERENCE TO RELATED APPLICATIONS

This application is a continuation of International Patent Application No. PCT/CN2020/096495 with a filing date of Jun. 17, 2020, designating the United States, and further claims priority to Chinese Patent Application No. 201911071791.6 with a filing date of Nov. 5, 2019. The content of the aforementioned applications, including any intervening amendments thereto, are incorporated herein by reference.

TECHNICAL FIELD

The present invention relates to the technical field of particle characterization, and more particularly, to a method and system for measuring a refractive index of a particle by using a polarization difference of scattered light distribution.

BACKGROUND

A particle refers to a specifically shaped geometry with a size generally ranging from millimeters to nanometers, which not only refers to a solid particle, but also comprises a fluid particle such as a droplet and a bubble. The particle is ubiquitous in the nature, and widely affects or is widely used in industrial production and scientific research. The size of the particle is one of the most important parameters of the particle. In recent years, with the application of various new particle materials, there is a higher requirement for particle size measurement of the particle. A laser particle size analyzer (LPSA) based on a static light scattering principle has been more widely used.

According to the geometrical optical approximation theory of light scattering, a scattered light intensity is mainly diffracted light in a small angle range when a particle size is much larger than a light wavelength, and a main peak of light energy distribution appears in a small forward angle. If only the particle far larger than the light wavelength is measured and a scattered light acceptance angle of the LPSA is limited to a small angle range, such as below 5 degrees, then the LPSA based on the Fraunhofer diffraction theory may analyze a particle size distribution (PSD) of a sample without inputting refractive index value. However, the lower measurement limit of the existing commercial LPSA is as small as 0.1 μm, so that the maximum scattering angle acceptance range should reach above 60 degrees. In this case, all scattered light energy distributions of particles of any size are related to the refractive index. If particles with the same particle size have different refractive indexes, the light energy distributions are obviously different. Therefore, when a LPSA based on Mie scattering theory is used for particle size analysis, it is necessary to input an accurate refractive index of the sample in advance, a corresponding scattered light energy matrix is calculated, and then a particle size distribution is inversely calculated according to the scattered light distribution. If the inputted refractive index value is wrong, a wrong PSD result will be generated.

At present, the refractive index value of the sample is mostly obtained by looking up a table in book when using LPSA to measure the sample. However, the refractive index of the actual sample is related to an incident light wavelength, an impurity content and other factors, so that it is difficult to determine the accurate refractive index of the particle, which often leads to a big error between the measured result of the sample and the actual PSD.

Up to now, although there are several methods for measuring the refractive index by using scattered light signals, there are some limitations.

SUMMARY

In order to overcome the problems above, the present invention provides a method and system for measuring a refractive index of a particle sample by using a polarization difference of scattered light distribution, in the case that a refractive index and a particle size distribution of a measured particle sample are unknown, the refractive index of the particle sample can be calculated only by using a scattered light signal of the measured particle sample, and then an accurate particle size distribution is obtained by using the measured refractive index.

The technical solutions of the present invention are as follows.

A method for measuring a refractive index of a particle sample by using a polarization difference of scattered light distribution comprises the steps of:

S1: when a light wave irradiates particles located near a coordinate origin O along a Z axis, receiving light scattered by the particles by a detector located in an XOZ plane, wherein the detector is an array composed of a plurality of independent detection units, all units are located in the XOZ plane, and each unit corresponds to a different scattering angle range, letting a total number of the detection units as k, when illumination light is linearly polarized with a polarization direction parallel to a Y axis, so that the polarization direction of scattered light received by each detection unit is perpendicular to the XOZ plane which is namely a scattering surface; the scattered light energy is received by each detection unit, the values of which are $E_{\perp 1}$, $E_{\perp 2}$, ..., $E_{\perp k}$, respectively, or $E_\perp[E_{\perp 1}, E_{\perp 2}, \ldots, E_{\perp k}]^T$ in vector form, and called a vertically polarized scattered light energy distribution; similarly, when the particle is illuminated by the linearly polarized light with the polarization direction parallel to the X axis, the scattered light energy received by each unit of the detector consists a horizontally polarized scattered light energy distribution, which is represented by $E_\|$, wherein $E_\|=[E_{\|1}, E_{\|2}, \ldots, E_{\|k}]^T$; $E_\perp$ and $E_\|$ are input into a processor, and a difference between the vertically polarized scattered light energy distribution and the horizontally polarized scattered light energy distribution is called as a scattered light energy distribution polarization difference, and the difference is recorded as $E_d$, so that $E_d=E_\perp-E_\|=[E_{d1}, E_{d2}, \ldots, E_{dk}]^T$, which is calculated by the processor;

S2: supposing a refractive index $n^{(i)}$ of the particle, according to Mie theory, calculating a vertically polarized scattered light energy matrix $M_\perp^{(i)}$ and a scattered light polarization difference matrix $M_d^{(i)}$ with k×l dimensions, wherein k is a number of detector units, l is a number of representative particle size classes, and i is a serial number of a refractive index value;

S3: inversely calculating a particle size distribution $W^{(i)}=[W_1^{(i)}, w_2^{(i)}, \ldots, w_l^{(i)}]^T$ of the measured particle sample according to the acquired $E_\perp$ value and the vertically polarized scattered light energy matrix $M_\perp^{(i)}$, wherein $W_j^{(i)}$ (j=1, 2, ..., l) represents a ratio of a particle volume with particle size in a $j^{th}$ size class to a total particle volume when it is supposed that the refractive index is $n^{(i)}$;

S4: calculating a polarization difference distribution $E'_d{}^{(i)} = M_d{}^{(i)} W^{(i)}$, according to the particle size distribution $W^{(i)}$ obtained in S3 and the scattered light polarization difference matrix $M_d{}^{(i)}$;

S5: calculating a root mean square (RMS) error $$\sigma^{(i)} = \sqrt{\sum_{u=1}^{k} \left( \frac{E_{du}}{\sqrt{\sum_{v=1}^{k} E_{dv}^2}} - \frac{E'^{(i)}_{du}}{\sqrt{\sum_{v=1}^{k} (E'^{(i)}_{dv})^2}} \right)^2}$$

according to the polarization difference $E_d$ of the scattered light and $E'_d{}^{(i)}$; and S6: changing the refractive index of the particle into another value $n^{(i)}$, repeating S2 to S5 to calculate the RMS error $\sigma^{(j)}$, and repeating the process over and over until finding out the true refractive index of the particle sample with the smallest RMS error, wherein the refractive index is a true refractive index of the particle, and the particle size distribution corresponding to the refractive index is a true particle size distribution of the particle.

A system for measuring a refractive index of a particle sample by using a polarization difference of scattered light distribution comprises a laser light source module, photoelectric detectors arranged in an array, a processor for receiving and processing signals from the photoelectric detectors, and a memory for storing a processing program.

Further, the laser light source module comprises a linearly polarized light source and a half-wave plate arranged at an emitting end of the linearly polarized light source, or the laser light source module comprises a natural light source and a polarizer arranged at an emitting end of the natural light source.

The present invention has the beneficial effects that: when both the refractive index and the particle size distribution of the measured particle sample are unknown, the scattered light signal obtained by the LPSA can be used to calculate the refractive index of the sample, thereby obtaining an accurate particle size distribution of the sample.

DETAILED DESCRIPTION

Figure 1:
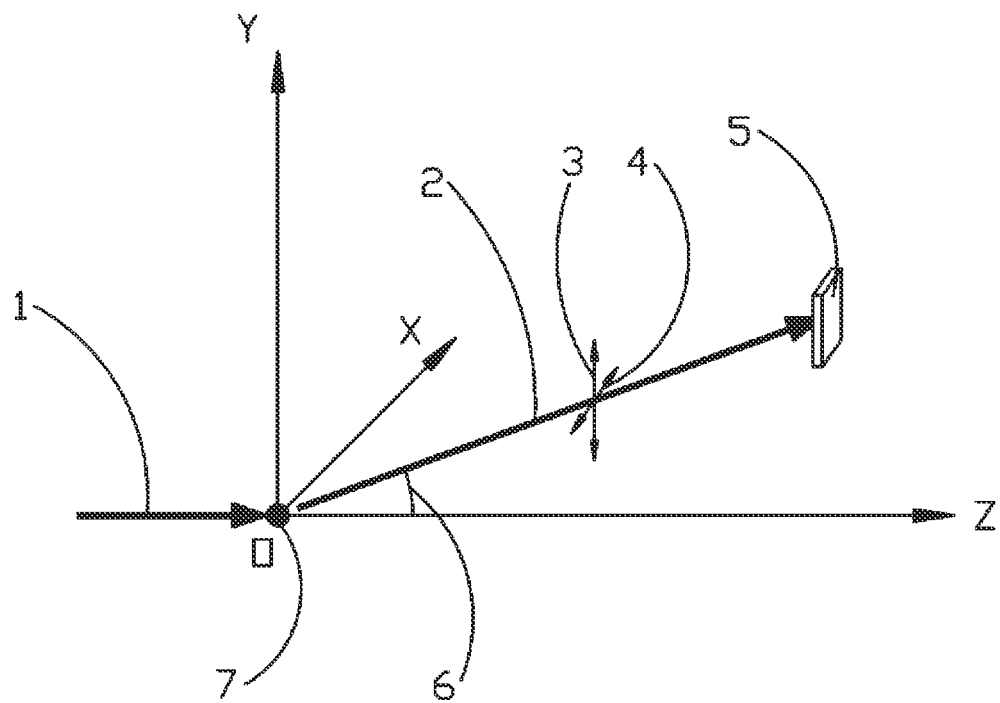
FIG. 1 is a principle diagram of the present invention.

A method for measuring a refractive index of a particle sample by using a polarization difference of scattered light distribution comprises the steps of:

S1: when a light wave irradiates particles located near a coordinate origin O along a Z axis, receiving light scattered by the particles by a detector located in an XOZ plane, wherein the detector is an array composed of a plurality of independent detection units, all units are located in the XOZ plane, and each unit corresponds to a different scattering angle range, letting a total number of the detection units as k, when illumination light is linearly polarized with a polarization direction parallel to a Y axis, so that the polarization direction of scattered light received by each detection unit is perpendicular to the XOZ plane which is namely a scattering surface; the scattered light energy is received by each detection unit, the values of which are $E_{\perp 1}$, $E_{\perp 2}$, ..., $E_{\perp k}$, respectively, or $E_\perp = [E_{\perp 1}, E_{\perp 2}, \ldots, E_{\perp k}]^T$ in vector form, and called a vertically polarized scattered light energy distribution; similarly, when the particle is illuminated by the linearly polarized light with the polarization direction parallel to the X axis, the scattered light energy received by each unit of the detector consists a horizontally polarized scattered light energy distribution, which is represented by $E_\parallel$, wherein $E_\parallel = [E_{\parallel 1}, E_{\parallel 2}, \ldots, E_{\parallel k}]^T$; $E_\perp$ and $E_\parallel$ are input into a processor, and a difference between the vertically polarized scattered light energy distribution and the horizontally polarized scattered light energy distribution is called as a scattered light energy distribution polarization difference, and the difference is recorded as $E_d$, so that $E_d = E_\perp - E_\parallel = [E_{d1}, E^{d2}, \ldots, E_{dk}]^T$, which is calculated by the processor;

S2: supposing a refractive index no of the particle, according to Mie theory, calculating a vertically polarized scattered light energy matrix $M_\perp^{(i)}$ and a scattered light polarization difference matrix $M_d^{(i)}$ with k×l dimensions, wherein k is a number of detector units, l is a number of representative particle size classes, and i is a serial number of a refractive index value;

S3: inversely calculating a particle size distribution $W^{(i)} = [w_1^{(i)}, w_2^{(i)}, \ldots, w_l^{(i)}]^T$ of the measured particle sample according to the acquired $E_\perp$ value and the vertically polarized scattered light energy matrix $M_\perp^{(i)}$, wherein $w_j^{(i)}$ (j=1, 2, ..., l) represents a ratio of a particle volume with particle size in a $j^{th}$ size class to a total particle volume when it is supposed that the refractive index is $n^{(i)}$;

S4: calculating a polarization difference distribution $E'_d{}^{(i)} = M_d{}^{(i)} W^{(i)}$, according to the particle size distribution $W^{(i)}$ obtained in S3 and the scattered light polarization difference matrix $M_d{}^{(i)}$;

S5: calculating a root mean square (RMS) error $$\sigma^{(i)} = \sqrt{\sum_{u=1}^{k} \left( \frac{E_{du}}{\sqrt{\sum_{v=1}^{k} E_{dv}^2}} - \frac{E'^{(i)}_{du}}{\sqrt{\sum_{v=1}^{k} (E'^{(i)}_{dv})^2}} \right)^2}$$

according to the polarization difference $E_d$ of the scattered light and $E'_d{}^{(i)}$; and S6: changing the refractive index of the particle into another value $n^{(i)}$, repeating S2 to S5 to calculate the RMS error $\sigma^{(j)}$, and repeating the process over and over until finding out the true refractive index of the particle sample with the smallest RMS error, wherein the refractive index is a true refractive index of the particle, and the particle size distribution corresponding to the refractive index is a true particle size distribution of the particle.

By the method provided by the embodiment, when the refractive index of the measured particle sample is unknown, the scattered light signal obtained by a LPSA can be used to calculate the refractive index of the sample, thereby obtaining an accurate particle size distribution of the sample.

A system for measuring a refractive index of a particle sample by using a polarization difference of scattered light distribution in the embodiment comprises a laser light source module, photoelectric detectors arranged in an array, a processor for receiving and processing signals from the photoelectric detectors, and a memory for storing a processing program.

Scattered light energy of a measured sample is measured by a laser particle size analyzer (LPSA). Specifically, as shown in FIG. 1, incident light 1 propagates along a Z-axis and irradiates on particles 7 located near a coordinate origin O (only one particle is illustratively drawn herein, there is a particle group composed of a plurality of particles of different sizes in reality). After meeting the particle 7, light scattering event occurs and scattered light 2 shown in FIG. 1 is one of the scattered lights. A series of detectors 5 (referring to an array composed of a plurality of independent detectors, wherein each detector center corresponds to one scattering angle 6, and only one unit is illustratively shown herein) in a LPSA are placed in an XOZ plane. and an electric field vector of the scattered light wave propagating in the XOZ plane may be decomposed into a component 3 (called "vertically polarized component") vibrating perpendicular to the XOZ plane and a component 4 (called "horizontally polarized component") vibrating parallel to the XOZ plane. Different detectors are used for receiving scattered light with different scattering angle ranges. The vertically polarized component received by each detector is $E_{\perp 1}$, $E_{\perp 2}$, ..., or $E_{\perp k}$ respectively, which is called the vertically polarized scattered light energy distribution. For brevity, the vertically polarized scattered light energy distribution is represented by the vector $E_\perp$, wherein $E_\perp = [E_{195\ 1}, E_{\perp 2}, \ldots, E_{\perp k}]^T$, and k herein is a total number of the independent detection units of the detector. Similarly, horizontal components of these scattered light signals are called "horizontally polarized scattered light energy distributions", which are represented by $E_\parallel$, wherein $E_\parallel = [E_{\parallel 1}, E_{\parallel 2}, \ldots, E_{\parallel k}]^T$. $E_\perp$ and $E_\parallel$ are inputted into a computer. A difference between the vertically polarized scattered light energy distribution and the horizontally polarized scattered light energy distribution is called as a polarization difference of the scattered light distribution, and denoted as $E_d$, Therefore, $E_d = E - E_\parallel$. $E_d$ is calculated by the computer.

The vertically polarized scattered light energy distribution $E_\perp$ and the horizontally polarized scattered light energy distribution $E_\parallel$ in the embodiment may be realized in the following three ways.

Figure 2:
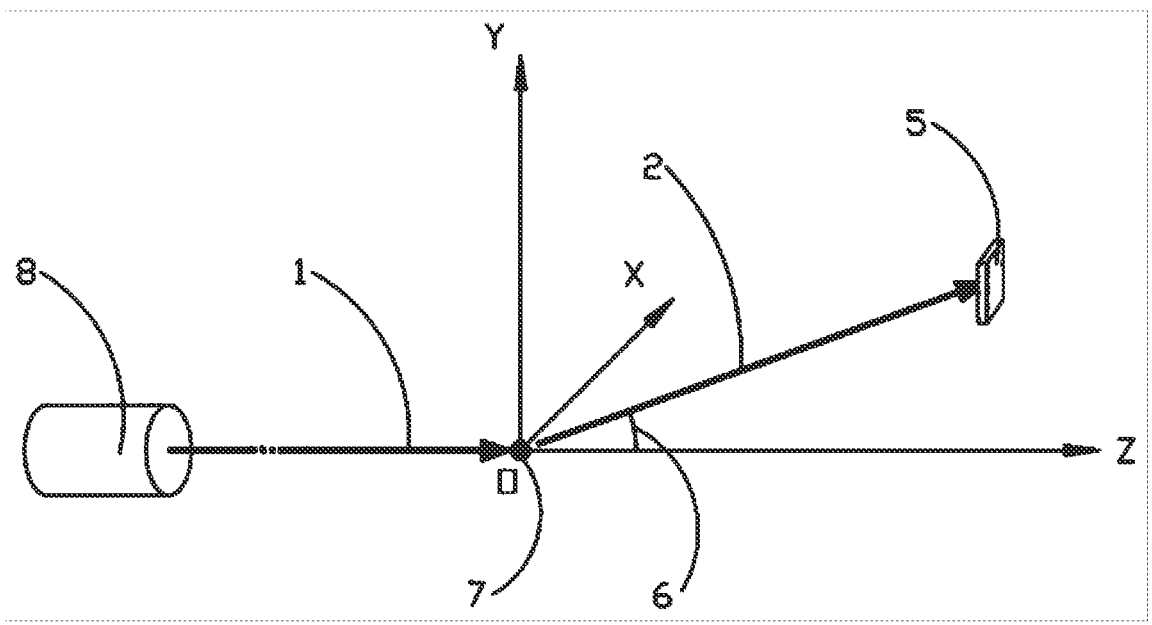
FIG. 2 is a schematic diagram of a light path realized by a first laser light source module.

I: as shown in FIG. 2, the laser light source 8 is a linearly polarized light source, the polarization direction of which can be rotated around the Z axis through a rotating mechanism, so that a polarization direction of emitted light is parallel to the Y axis first. In this case, the scattered light energy distribution measured by the detector 5 is the vertically polarized scattered light distribution $E_\perp$. Then, the light source is rotated by 90 degrees around the Z axis, and at the moment, the scattered light energy distribution measured by the detector 5 is the horizontally polarized scattered light energy distribution $E_\parallel$.

Figure 3:
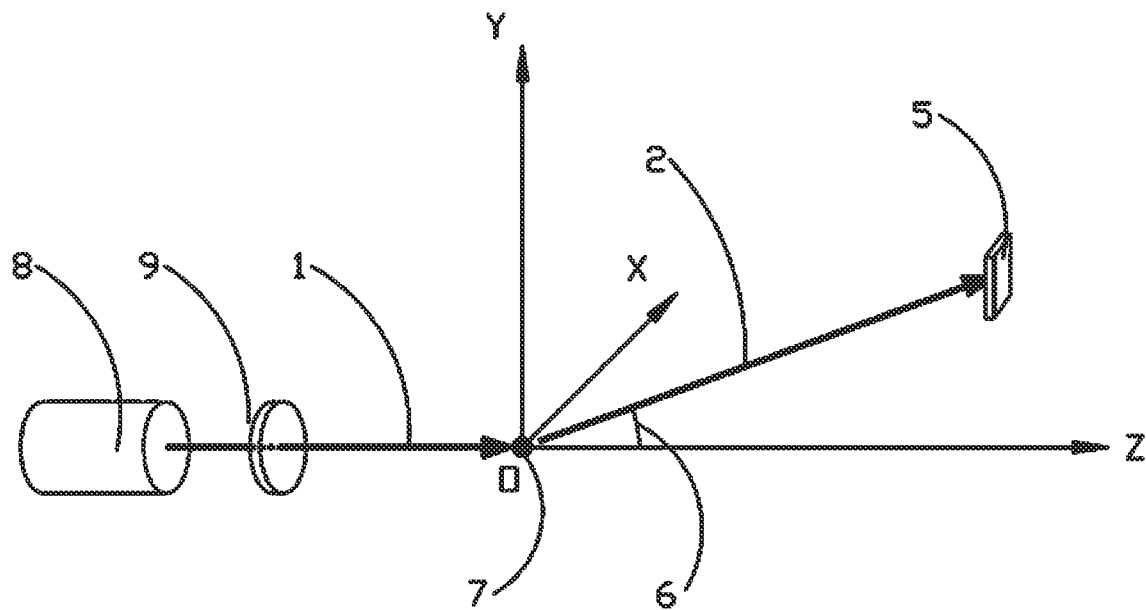
FIG. 3 is a schematic diagram of a light path realized by a second laser light source module.

II: as shown in FIG. 3, the laser light source 8 is the linearly polarized light source with a polarization direction parallel to the Y axis. A half-wave plate 9 is placed on an emitting light path, which may be rotated around the Z axis. When a main cross-section of the half-wave plate 9 is parallel to the Y axis, the scattered light energy distribution measured by the detector 5 is the vertically polarized scattered light energy distribution $E_\perp$. Then, the half-wave plate 9 is rotated by 45 degrees, and at the moment, the scattered light energy distribution measured by the detector 5 is the horizontally polarized scattered light energy distribution $E_\parallel$.

Figure 4:
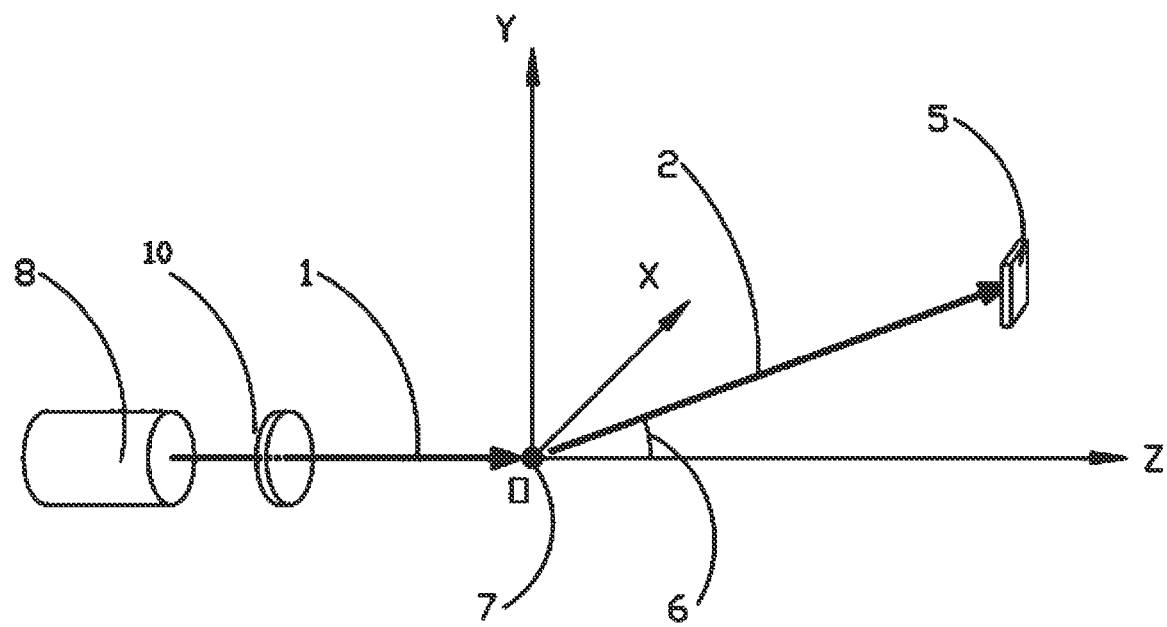
FIG. 4 is a schematic diagram of a light path realized by a third laser light source module.

III: as shown in FIG. 4, the laser light source 8 is unpolarized (natural) light, and a polarizer 10 is placed on the emitting light path, which may be rotated around the Z axis. When a polarization direction of the polarizer 10 is parallel to the Y axis, the scattered light energy distribution measured by the detector 5 is the vertically polarized scattered light energy distribution $E_\perp$. Then, the polarizer 10 is rotated by 90 degrees, and at the moment, the scattered light energy distribution measured by the detector is the horizontally polarized scattered light energy distribution $E_\parallel$.

It should also be noted that a memory stores a computer-readable storage memory medium, which may be various memory media with a data storage function, comprising but being not limited to non-volatile memories such as FLASH and EEPROM. When a processor executes a computer program, the method for measuring the refractive index of the particle above may be realized.

The embodiments above only show several implementations of the present invention, and the descriptions are more specific and detailed, but the embodiments cannot be construed as limiting the patent scope of the present invention. It should be pointed out that those of ordinary skills in the art may further make several modifications and improvements without departing from the concept of the present invention, and these modifications and improvements all fall within the scope of protection of the present invention. Therefore, the scope of protection of the patent of the present invention should be subject to the appended claims.

What is claimed is:

1. A system for measuring refractive index of a particle sample by using a polarization difference of scattered light distribution, comprising a laser light source module, a plurality of photoelectric detectors arranged in an array, a processor for receiving and processing electrical signals outputted from the detector, and a memory for storing a processing program;

wherein the laser light source module comprises a linearly polarized laser light source and a light source rotating device, or a linearly polarized light source and a half-wave plate which is arranged at an emitting end of the linearly polarized light source and is capable of being rotated by 45 degrees.

2. The system for measuring the refractive index of the particle sample by using the polarization difference of the scattered light distribution according to claim 1, wherein the laser light source module comprises an unpolarized laser light source and a polarizer which is arranged at an emitting end of the unpolarized laser light source and is capable of being rotated by 90 degrees.

* * * * *